E. K. ENEBO.
AUTOMATICALLY ACTUATED GATE.
APPLICATION FILED OCT. 18, 1915.
1,226,761.
Patented May 22, 1917.
5 SHEETS—SHEET 1.
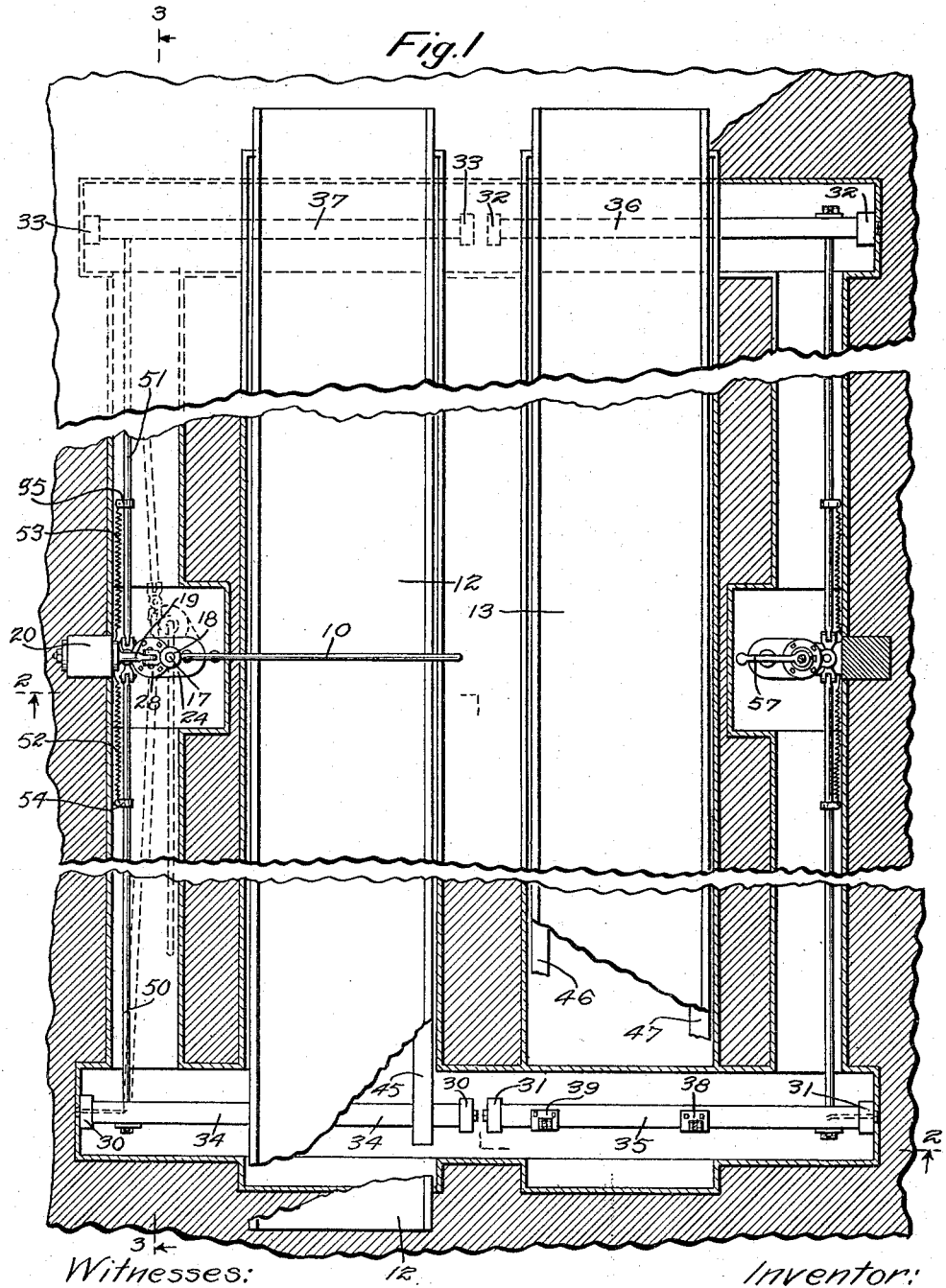
Witnesses:
Alex. Sagaard
H. A. Bowman
Inventor:
Elias K. Enebo
By F. A. Whiteley
his Attorney.

E. K. ENEBO.
AUTOMATICALLY ACTUATED GATE.
APPLICATION FILED OCT. 18, 1915.
1,226,761.
Patented May 22, 1917.
5 SHEETS—SHEET 2.
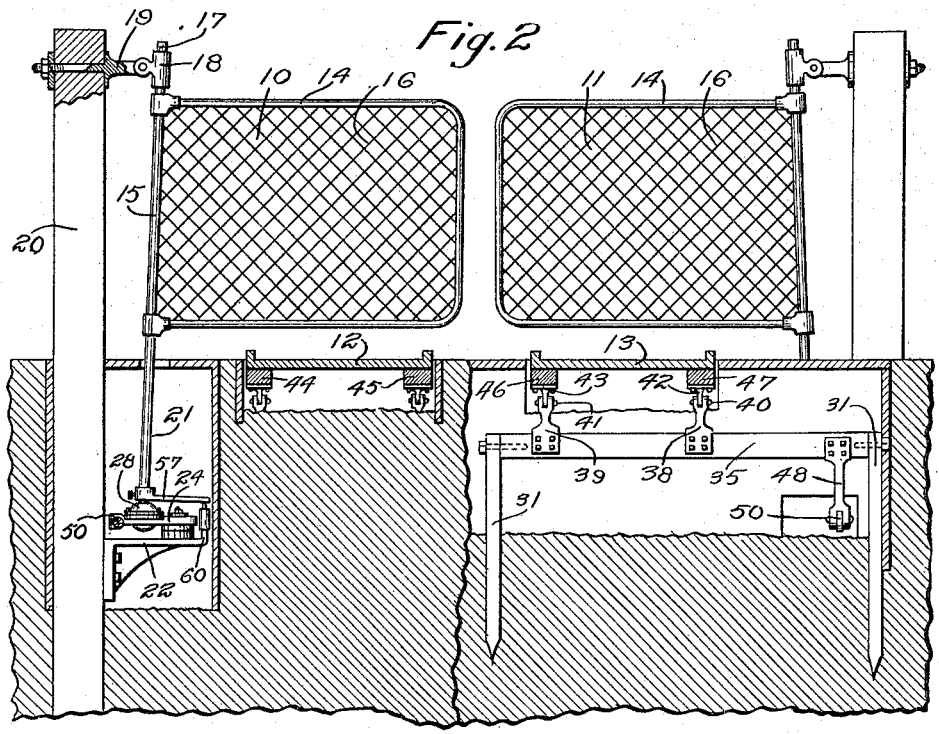
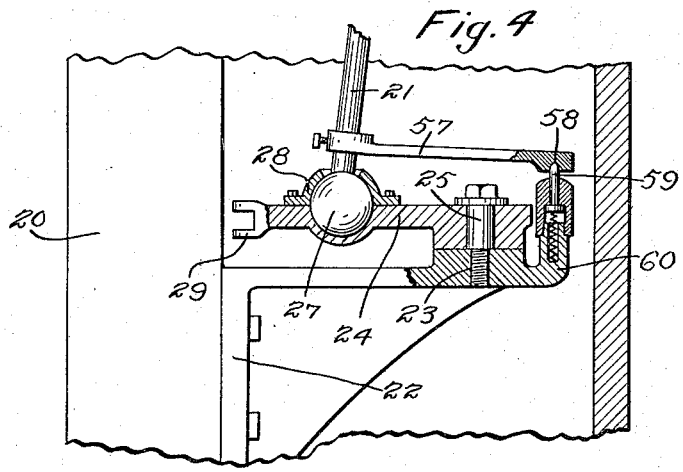
Witnesses:
Alex. Lagaard.
H. A. Bowman.
Inventor:
Elias K. Enebo.
By his Attorney.

E. K. ENEBO.
AUTOMATICALLY ACTUATED GATE.
APPLICATION FILED OCT. 18, 1915.
1,226,761.
Patented May 22, 1917.
5 SHEETS—SHEET 3.
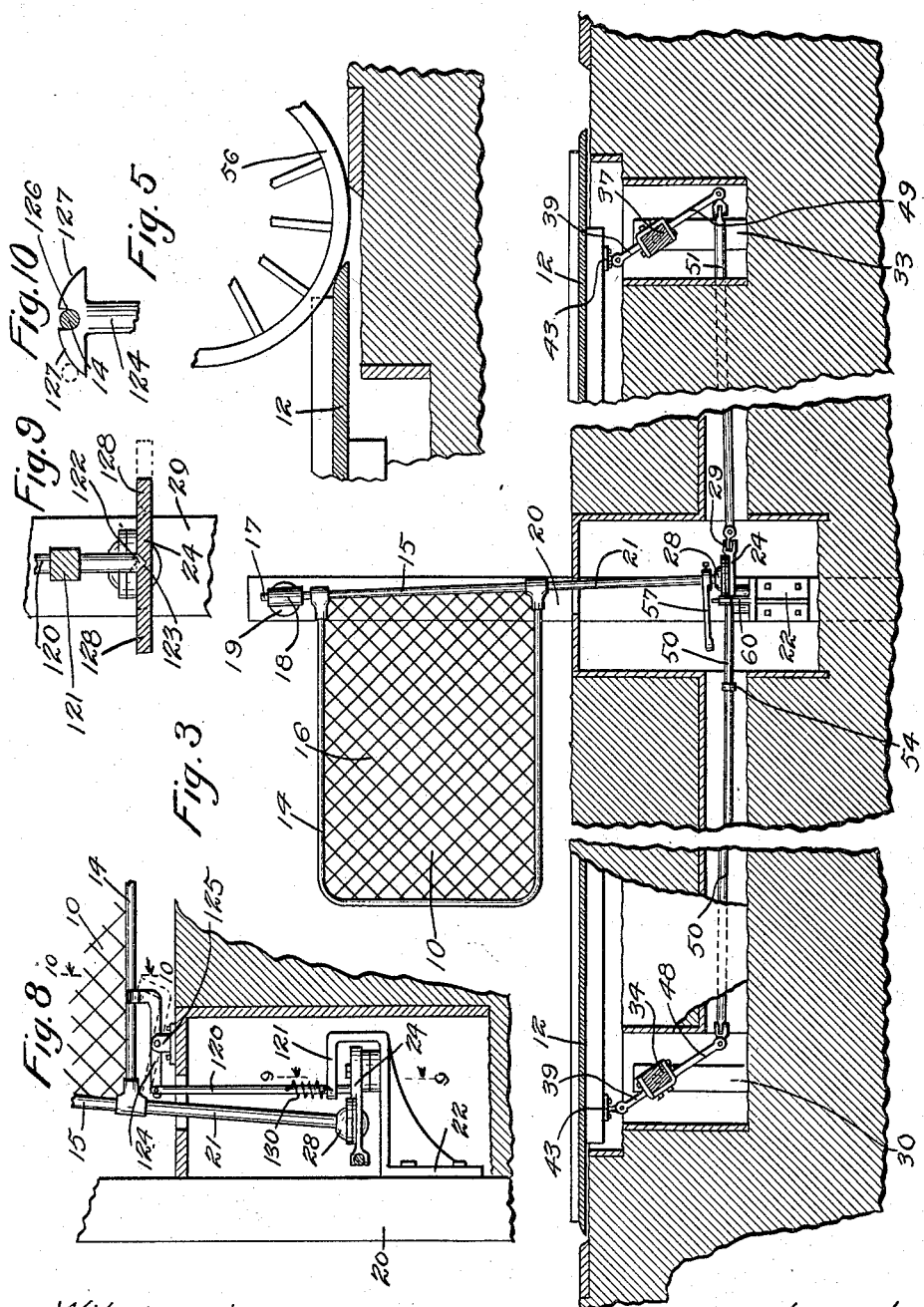
Witnesses:
Alex. Lajaard.
H. A. Bowman.
Inventor:
Elias K. Enebo
By J. A. Whiteley
his Attorney.

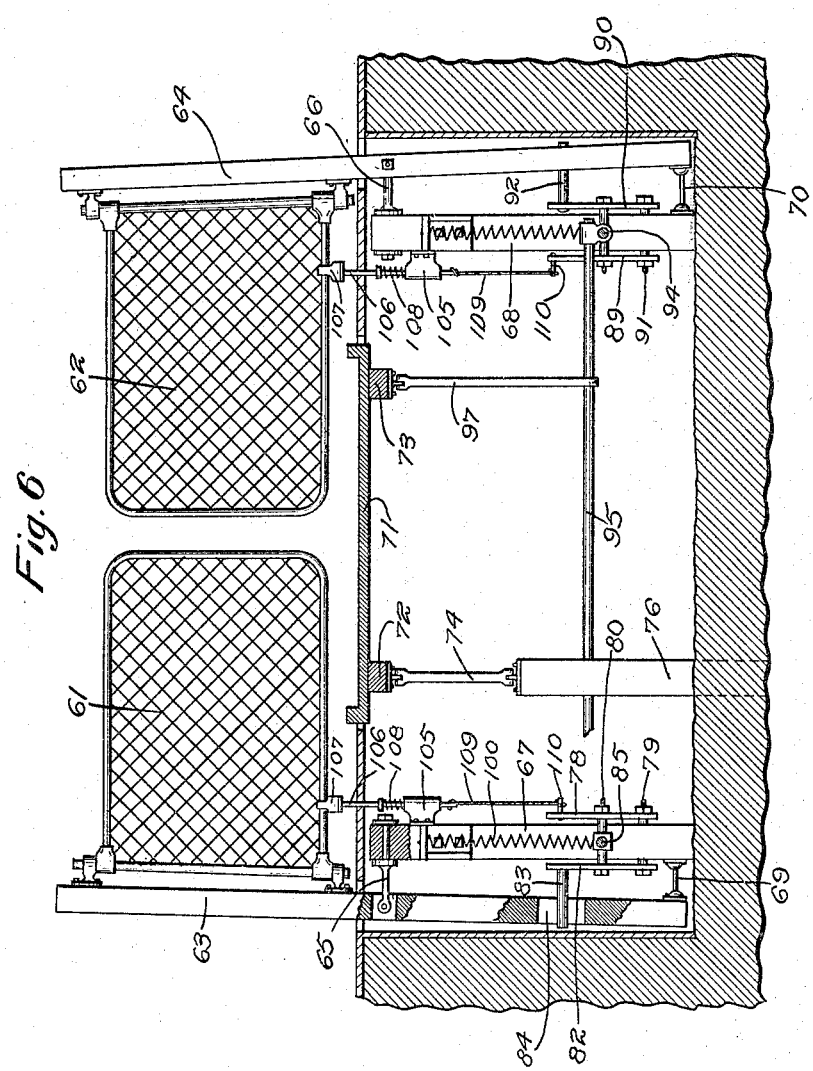

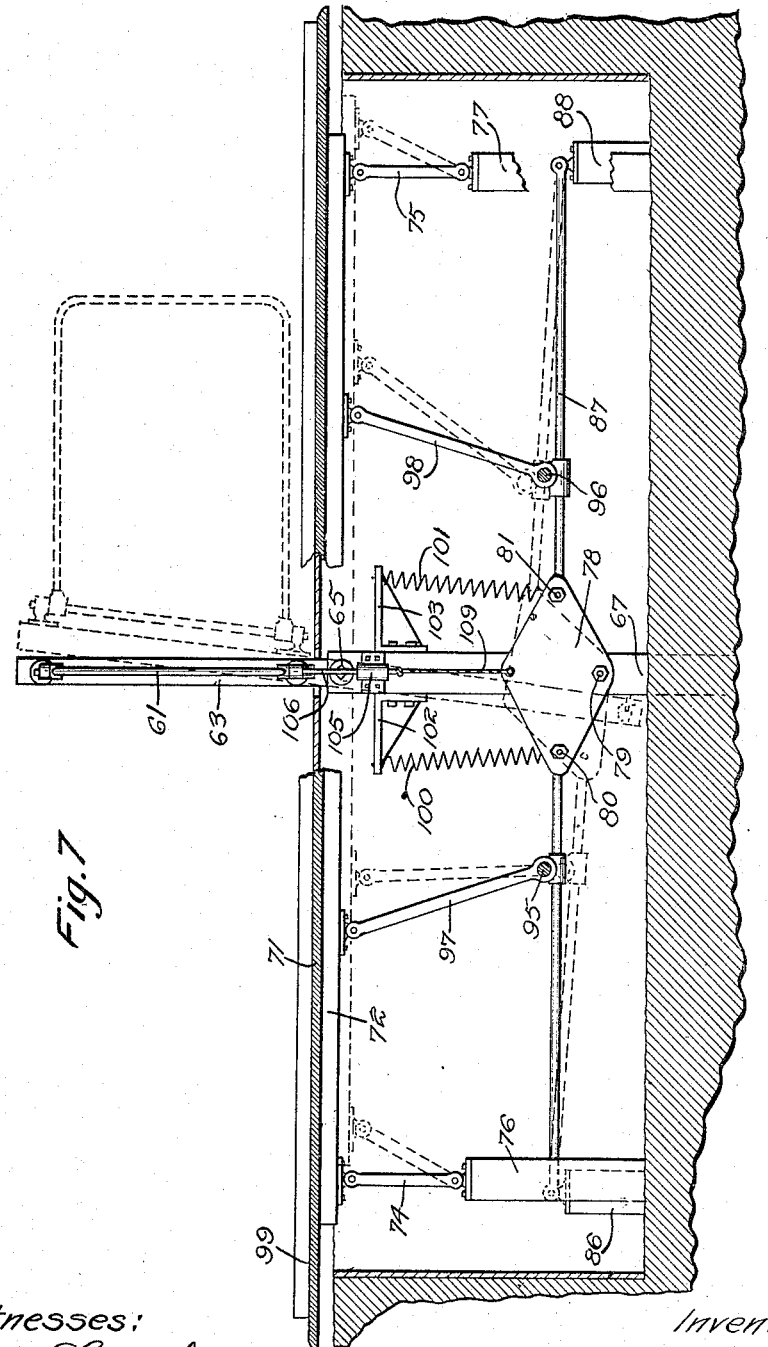

UNITED STATES PATENT OFFICE.

ELIAS K. ENEBO, OF MINNEAPOLIS, MINNESOTA.

AUTOMATICALLY-ACTUATED GATE.

1,226,761. Specification of Letters Patent. Patented May 22, 1917.

Application filed October 18, 1915. Serial No. 56,441.

*To all whom it may concern:*

Be it known that I, ELIAS K. ENEBO, a citizen of the United States, residing at Minneapolis, in the county of Hennepin and State of Minnesota, have invented certain new and useful Improvements in Automatically-Actuated Gates, of which the following is a specification.

My invention relates to automatically-actuated gates and has for its object to provide a gate which will automatically open and close upon the approach and departure of a vehicle and which is not affected by cattle or horses or other animals. To this effect I provide a swinging gate whose axis normally is out of plumb and may be shifted to cause the gate to swing open and closed. My invention further provides a wheel track or platform which can be horizontally displaced when engaged by a vehicle to shift the gate axis and cause the gate to open and which will return to its normal position when the vehicle leaves the track, causing the gate to close.

The full objects and advantages of my invention will appear in connection with the detailed description thereof and are particularly pointed out in the claims.

In the drawings, illustrating the application of my invention in one form,—

Figure 1 is a plan view of my preferred form of gate and actuating mechanism with parts cut away to show other parts beneath. Fig. 2 is an elevational sectional view of the same taken on line 2—2 of Fig. 1. Fig. 3 is an elevational sectional view of the same taken substantially on line 3—3 of Fig. 1. Fig. 4 is an enlarged view of some of the parts shown in Fig. 2, some of them being shown in section. Fig. 5 is an elevational view of some of the parts shown in Fig. 3, illustrating the manner of shifting the wheel track to actuate the gates. Fig. 6 is a transverse sectional elevational view of a modified form of my invention. Fig. 7 is a longitudinal sectional elevational view of the device shown in Fig. 6. Fig. 8 is a view of some of the parts shown in Fig. 2 with a modified form of gate locking device. Figs. 9 and 10 are views of the parts shown in Fig. 8 taken on lines 9—9 and 10—10, respectively of Fig. 8.

With the double swinging gates 10 and 11, shown in Figs. 1, 2 and 3, I employ two wheel tracks 12 and 13 each mounted to independently open and close the corresponding gate, thus permitting vehicles to pass independently through the gate in both directions.

Gates 10 and 11 are identical in construction and the elements actuating them are the same, and for that reason most of the detailed description will be given to one of these gates, namely, gate 10. As shown, gate 10 comprises a frame 14 attached to an axial rod 15 on which the gate swings and a woven wire or other covering member 16. Rod 15 extends beyond the gate proper and at its upper end 17 is pivoted in a bearing 18, said bearing being itself pivoted in a flanged bolt 19 passing through and secured to a hinge post 20. The lower end 21 of rod 15 extends below the surface of the ground and is supported in a manner best shown in Fig. 4. Bolted to post 20 is a bracket 22 to which is pivoted by a bolt 25 at 23 an oscillating arm 24. Arm 24 is provided with a socket 26 in which rests a ball 27 fast on the end of rod 21 and held in place by a cap 28. Arm 24 is further provided with a forked end 29 to which is attached the means for oscillating the same. It will be noted in Fig. 2 that the axial rod 15 is normally out of plumb and that the gate 10 always tends to remain in the same vertical plane with said rod, due to gravity. In Fig. 1 the rod 15 has been shown in dotted lines oscillated so that the vertical plane containing it will be at right angles to that containing the same when it is in its normal position, as shown in full lines. This of course tends to cause the gate to swing open in the position shown in full lines in Fig. 3. An oscillation of arm 24 in the opposite direction would, however, cause the gate to open in the opposite direction, so that the gate has a full swinging range of one hundred and eighty degrees. The rotatability of bolt 19 in post 20, together with the hinging of casting 18, permit this motion to take place, as seen from Fig. 2.

The wheel tracks or platforms 12 and 13 are supported in a manner best shown in Figs. 1, 2 and 3. For a distance below the level of the ground the earth is excavated to give space for the various members and parts of my invention and the sides boarded up to prevent the earth from caving in. The exact way of doing this is, however, unimportant and may be done as clearly shown in Figs. 1, 2 and 3 to necessitate a minimum amount of excavation, or as shown in Figs. 6 and 7 to make a single large hole. A number of pairs of posts 30, 31, 32 and 33 are driven into the ground within the excavated portion and a number of beams 34, 35, 36 and 37 situated transversely with respect to the roadway are pivoted, respectively, between each pair of posts. To each of beams 34, 35, 36 and 37 is rigidly secured two columns 38 and 39 to which are hinged at 40 and 41 two feet 42 and 43. To the feet 42 and 43 are rigidly attached longitudinal beams 44, 45, 46 and 47 on which are built and supported the aforementioned wheel tracks 12 and 13. It will be noted in Fig. 3 that posts 38 and 39 are arranged parallel to each other, so that the wheel tracks 12 and 13 are free to rock independently on beams 34—36 and beams 35—36, respectively. Only two beams similar to 34 and 36 have been shown for each wheel track, though it is evident a greater number could be similarly equipped in case the longitudinal span should be too great. In line with the fork 29 on arm 24 is situated a downwardly-extending arm 48 attached to beam 34, and a similar arm 49 on beam 37. The lower extremity of arm 48 is universally connected to fork 29 by means of a link 50, and arm 49 is similarly connected to fork 29 by a similar link 51. As the wheel track 12 is rocked arm 24 is oscillated from side to side, shifting the vertical plane of the angularly-disposed axis 15 and causing the gate to swing. It will here be mentioned that the center of rotation of axis 15 in the vicinity of casting 18 lies in a vertical line between the center of oscillation of the ball 27 and the bolt 25, so that the arm 24 needs only to be oscillated about forty-five degrees to cause the gate to swing ninety degrees, thus preventing the arm 24 from swinging into dead center in regard to link 50 and rendering the device inoperative. The exact position is shown in dotted lines in Fig. 1.

The gates are normally left in a closed position, and to this end posts 41 and 42 must necessarily remain in a vertical position. To effect this result the two tension coil springs 52 and 53 are employed, which act between collars 54 and 55, fast on links 50 and 51, and the post 20 to cause the wheel track 12 to normally take a central and raised position. Instead of springs, counterweights can be used attached rigidly to beams 34, 35, 36 and 37, but not shown in the drawings. The operation of the device is best understood by reference to Fig. 5.
Wheel track 12 is normally above the level of the ground and when a wheel 56 approaches it said wheel tends to rock the same forward and downward, thus swinging the gate 10 away from the entering vehicle. As long as the vehicle remains upon the track the same is held depressed and the gate kept open, but when the vehicle passes off from the track the same resumes its normal position, due to springs 52 and 53, and the gate closes.

It will hence be comprehended that if any animals should step upon the wheel tracks 12 or 13 the same would not oscillate to open the gates since they are on a dead center in respect to any purely vertical forces, a horizontal component being requisite to actuate the same. To prevent the gates from being opened by forces directly applied to the same, the device shown in Fig. 4 is employed. An arm 57, having a socket 58, is rigidly secured to rod 21 and is adapted to engage a spring-projected catch pin 59 operating within a casting 60 issuing from bracket 22. In oscillating arm 24 the pin 59 is forced out of socket 58, since the distance from pin 59 to ball 27 is lessened, thus leaving the gate 10 free to swing. In returning to the closed position gate 10 gains enough momentum to be just able to depress pin 59 to allow the same to raise into socket 58 and hold the gate in place. As before mentioned, both gates and devices connected therewith are identical, so that the parts described for one apply to the other.

Figs. 8, 9 and 10 show a modification of the gate-locking device illustrated in Fig. 4, which is to be preferred to the one shown in that figure. A rod 120 slidably mounted in an arm 121 extending from casting 22 is provided with a sharpened point 122 which fits in a V groove 123 in casting 24 when the same is in a normal position, as shown in Fig. 9 in full lines. Rod 120 is pivotally connected with a horizontal lever 124 pivoted to a block 125 below the gate 10. Lever 124 is provided with a forked head 126 having flaring sides 127. When arm 24 of the gate structure is oscillated the point 122 of rod 120 is raised out of the V groove 123 and caused to ride upon the extended portions 128 of arm 24, as shown in dotted lines in Fig. 9, thus oscillating the lever 124 as shown in dotted lines in Fig. 8, disengaging the gate frame 14 from the head 126 and allowing the gate to swing. When arm 24 is returned to its normal position rod 120 is restored to its original lowered position in V groove 123 by means of a tension coil spring 130 attached to said rod and to the arm 121. As the gate swings back the frame 14 engages one of the surfaces 127 of head 126, as indicated in dotted lines in Fig. 10, and momentarily lowers said head until said frame becomes engaged in the forked portion of said head, as shown in full lines in Fig. 10. This form of lock is positive in action and holds the gate perfectly locked when the same is not in use.

In case it should be desired to operate both gates simultaneously from either or both wheel tracks, the intermediate bearing posts 30, 31, 32 and 33 could be dispensed with and the beams 34, 35, 36 and 37 could be made continuous. This, however, is also accomplished in the modification shown in Figs. 6 and 8. Here, a pair of ordinary gates 61 and 62 are hinged in the usual way to posts 63 and 64. Posts 63 and 64 are pivotally connected below the surface of the ground to the ends of oscillatory flanged bolts 65 and 66 attached to stationary posts 67 and 68 set into the ground. At their lower extremities posts 63 and 64 are obliquely held spaced from posts 67 and 68 by means of rods 69 and 70 attached to all of said posts with ball and socket joints. This in effect provides the same arrangement for causing the gate to swing as indicated in the preferred form of my invention.

In Fig. 7 is most clearly shown the mechanism for shifting posts 63 and 64. A single wheel track 71 is here shown supported on longitudinal beams 72 and 73. These beams are pivotally supported by arms 74 and 75 pivoted to posts 76 and 77 set in the ground, thus affording the same rocking movement to the wheel track as explained in the other form. To the lower portion of post 67, and on each side of it, are situated plates 78 and 82 pivoted to said post at 79. Both of plates 78 and 82 are held spaced by bolts 80 and 81 having collars thereon not shown in detail. From the uppermost portion of plate 82 extends a crank arm 83 operating in a slotted hole 84 in the post 63. From bolt 80 extends a link 85 pivoted at its other end to a post 86. Similarly, a link 87 is attached to bolt 81 and is pivoted on a post 88. In Fig. 6 it will be noted that gate 62 is also provided with double plates 89 and 90 pivoted to post 68 at 91 and provided with a crank arm 92 and tie bolts 93, from which extend links 94 similar to links 85 and 87. Across parallel links 85, 94, etc., are securely attached transverse rods 95 and 96. These rods are again pivotally connected with the wheel track beam supports 72 and 73 by a number of obliquely-positioned arms 97 and 98. From Fig. 7 can now be comprehended the operation of the mechanism. Imagine a vehicle approaching end 99 of the wheel track 71. On meeting the same said track is rocked forward, as shown in dotted lines, and arm 97 assumes a vertical position tending to swing link 85 downward and oscillate plates 82 and 78. Arm 98, on the contrary, assumes a more oblique position, due to its being normally inclined in the opposite direction from arm 85, and it causes link 87 to take a raised position. This movement also tends to oscillate plates 82 and 78 in the same direction. Due to this oscillation, crank arm 83 operates in slot 84 and swings gate post 63 in the position shown in dotted lines in Fig. 7, so that the gate 61 opens. It becomes evident, of course, that the same movements are taking place in connection with plates 89 and 90 and the gate post 64 of gate 62, so that both gates open simultaneously. The posts for gate 61 are returned to their normal positions by a pair of tension coil springs 100 and 101 acting between bolts 80 and 81 and brackets 102 and 103 fast on post 67. A similar pair of springs 104 serve the same purpose for gate 62.

To lock the gates I employ the following device. In castings 105, fastened to posts 67 and 68, slide catch rods 106 which are engageable with sockets 107 secured to each of the gates 61 and 62 and are held upward by springs 108. These catch rods are connected by means of cords 109 to pins 110 in the upper portions of plates 78 and 89, so that when the same are oscillated said catch rods are drawn downward and out of engagement, allowing the gates to swing, and when the same are restored to their normal positions said catch rods are raised so that the gates are held locked when they return.

Either of these forms of gates may be opened by a pedestrian provided he rock the wheel track forward with his foot, so that if he wishes to drive a herd of cows through the same he may do so. These forms of gates may also be used for only pedestrians, in which case the wheel tracks may be supplanted by a small platform or other foot lever so that the gate is opened by the foot, thus giving the free use of the arms for other purposes.

The advantages of my invention are manifest. The driver does not have to dismount the vehicle to open the gates, and yet the same can only be opened by persons or vehicles, preventing the passage of animals. In the preferred form the fittings and parts can be manufactured at a cost not greatly exceeding the ordinary price of a gate, so that the same can be set up very inexpensively.

I claim:

1. In combination with a support normally tilted in the plane of a gate opening, a gate mounted thereon for swinging movement in a horizontal direction, means to tilt the support to one side of said plane to cause the gate to swing under the influence of gravity in a direction opposite to that in which the support is tilted and spring operated means for restoring the support to normal position.

2. In combination with a housing, a support, a gate adapted to swing freely thereon, means within the housing to cause the gate to swing under the influence of gravity, a locking means for said gate comprising a pivoted lever secured to said housing and operative in one plane having a portion normally clasping the lower bar of the gate, a slide for oscillating said lever, and a cam operated from the gate-moving means for actuating the slide.

3. In combination with a support normally tilted in the plane of a gate opening, a gate mounted thereon for swinging movement in a horizontal direction, a platform in the roadway in front of the gate normally positioned above the surface of the roadway and having connections for tilting the bottom of the support toward the vehicle when it passes on the platform, means for holding said platform inoperative against direct vertical thrust but capable of responding to the horizontal force applied when the wheels of the vehicle strike the raised edge of the platform, means controlled by operation of the platform for holding the gate in normal closed position and for releasing the gate when the support is operated, and a spring for restoring said platform and holding means to initial position after the vehicle has passed off of the platform.

4. In combination with a gate post, a platform substantially on the level with the ground and spaced from said post, supporting means for said platform below the same, a support normally tilted in the plane of the gate opening pivoted to said gate post and extending below the level of the ground and platform between the post and platform, a gate mounted to swing on said support under the influence of gravity, and means below the level of the platform and the ground associated with the platform supporting means for shifting the gate support to cause the gate to operate.

5. In combination with a support, a gate adapted to swing freely thereon and means to cause the gate to swing under the influence of gravity, a locking means for said gate comprising a pivoted lever in the plane of the gate and having a portion normally clasping the lower bar of the gate, a slide for oscillating said lever, and a cam operated from the gate-moving means for actuating the slide.

6. In combination with a gate post, a swinging gate pivoted at its upper end to said gate post, a horizontal member pivoted to said post and having universal connection with the lower portion of said gate, a pair of parallel pivoted transverse beams, a number of vertical struts secured to said beams, a platform pivoted to and supported by said struts, depending arms secured to said beams, links connecting with said previously-named horizontal member so that as the platform is oscillated the lower gate pivot is shifted and the gate caused to operate by gravity, and means to restore the structure to its normal position.

7. In combination with a gate post, a housing, a gate support pivoted to said post and extending downward into said housing, a gate adapted to swing on said support above the housing, a bracket secured to the post within the housing, a plate pivoted to the bracket and having universal connections with the lower end of said gate support, a vertical rod slidably mounted at its lower end in said bracket adapted to engage a cam surface on said plate and extending up through the housing, a horizontal forked lever normally embracing the lower portion of the gate, pivoted to the housing and to the slidable rod and adapted to release the gate when the plate is oscillated, and means to oscillate the plate.

8. In combination with a gate post a shouldered bolt passing through the top of said post and adapted to oscillate within the same, a vertical bearing member pivoted to said bolt head, a support journaled in said bearing and adapted to move universally at the lower end thereof, a gate mounted upon said support, and means to shift the support to cause the gate to operate by gravity.

9. In combination with a gate post, a swinging gate pivoted at its upper end to said gate post, a horizontal member pivoted to said post and having universal connection with the lower portion of said gate, a pair of parallel pivoted cross beams, pairs of vertical struts secured to said cross beams, a platform pivoted to and supported by said struts, depending arms secured to said cross beams, links connecting said arms with said previously-named horizontal member so that as the platform is oscillated the lower gate pivot is shifted and the gate caused to operate by gravity, and springs attached to said links and said post for restoring the gates and platform to their normal position.

10. In combination with a swinging gate, a fixed swivel support for the upper portion thereof, a shiftable support for the lower portion of said gate, and means operated by said shiftable support engaging the lower portion of the gate and thereby locking the gate when in a closed position.

In testimony whereof I affix my signature in presence of two witnesses.

ELIAS K. ENEBO.

Witnesses:
F. A. WHITELEY,
H. A. BOWMAN.

Copies of this patent may be obtained for five cents each, by addressing the "Commissioner of Patents, Washington, D. C."